US008232335B2

(12) United States Patent
Danielson et al.

(10) Patent No.: US 8,232,335 B2
(45) Date of Patent: Jul. 31, 2012

(54) COMPOSITIONS AND METHODS FOR MAKING CLARIFIED AESTHETICALLY ENHANCED ARTICLES

(75) Inventors: Todd D. Danielson, Moore, SC (US); Jennifer Rockwood, Simpsonville, SC (US); Nathan A. Mehl, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 1227 days.

(21) Appl. No.: 11/349,021

(22) Filed: Feb. 7, 2006

(65) Prior Publication Data

US 2007/0185247 A1    Aug. 9, 2007

(51) Int. Cl.
*C08K 5/00* (2006.01)
(52) U.S. Cl. ........ 524/108; 524/124; 524/141; 524/582; 524/543
(58) Field of Classification Search .................. 524/108, 524/127, 141, 582, 543
See application file for complete search history.

(56) References Cited

U.S. PATENT DOCUMENTS

| 5,262,471 | A | | 11/1993 | Akao |
| 5,961,914 | A | * | 10/1999 | Mannion et al. ............... 264/544 |
| 2004/0180159 | A1 | | 9/2004 | Neal et al. ...................... 428/35.7 |
| 2004/0219319 | A1 | | 11/2004 | Brooks et al. .................. 428/35.7 |
| 2006/0178483 | A1 | * | 8/2006 | Mehta et al. ................... 525/240 |
| 2007/0197697 | A1 | * | 8/2007 | Botkin et al. .................. 524/128 |
| 2007/0228615 | A1 | | 10/2007 | Brooks et al. |

FOREIGN PATENT DOCUMENTS

| JP | 1996073666 | 3/1996 |
| JP | 10-17848 A | 1/1998 |
| JP | 10017848 | 1/1998 |
| JP | 11-349740 | 12/1999 |
| JP | 2000-302986 | 10/2000 |
| WO | 2005/115723 A2 | 12/2005 |

OTHER PUBLICATIONS

Commonly assigned U.S. Patent application entitled "Carbon black infrared absorbing compounds and methods of using such compounds in polypropylene articles", U.S. Appl. No. 11/225,106 to Milliken & Company, filed Sep. 14, 2005.
Exxon Mobil Chemical—Nova-Pack Americas 2004, High Speed Stretch Blow Molding of Polypropylene Bottles. Presented by Robert C. Portnoy, Ph.D., on Jan. 26, 2004.
OPP Bottles using high spped 2-stage SBM process, Plastic Technologies, Inc., PO Box 964, Holland, OH. Presented at Nova Pack Americas 2004 by Scott Steele on Jan. 26, 2004.
Statement of Bernard Vermeersch, regarding facts of SIPA Bottle, dated Mar. 1, 2006. Non-Analysis Agreement—Milliken & Company and Sipa SpA, dated Mar. 2003.

* cited by examiner

*Primary Examiner* — Peter D Mulcahy
(74) *Attorney, Agent, or Firm* — Robert M. Lanning

(57) ABSTRACT

Thermoplastic articles may be manufactured having a high degree of visual appeal to consumers. Clarifying agents may be employed as additives in such thermoplastic articles to produce high clarity articles. A coloring agent may be mixed with clarifying agents to form a first blend, and then such a first blend may be applied in very low loadings to form a clarified polymeric article. It is possible to achieve an observable visual benefit while using very low loadings of coloring agent in a polyolefin, such as polypropylene. Carbon black is a pigment that may provide such observable benefits in polypropylene.

18 Claims, 4 Drawing Sheets

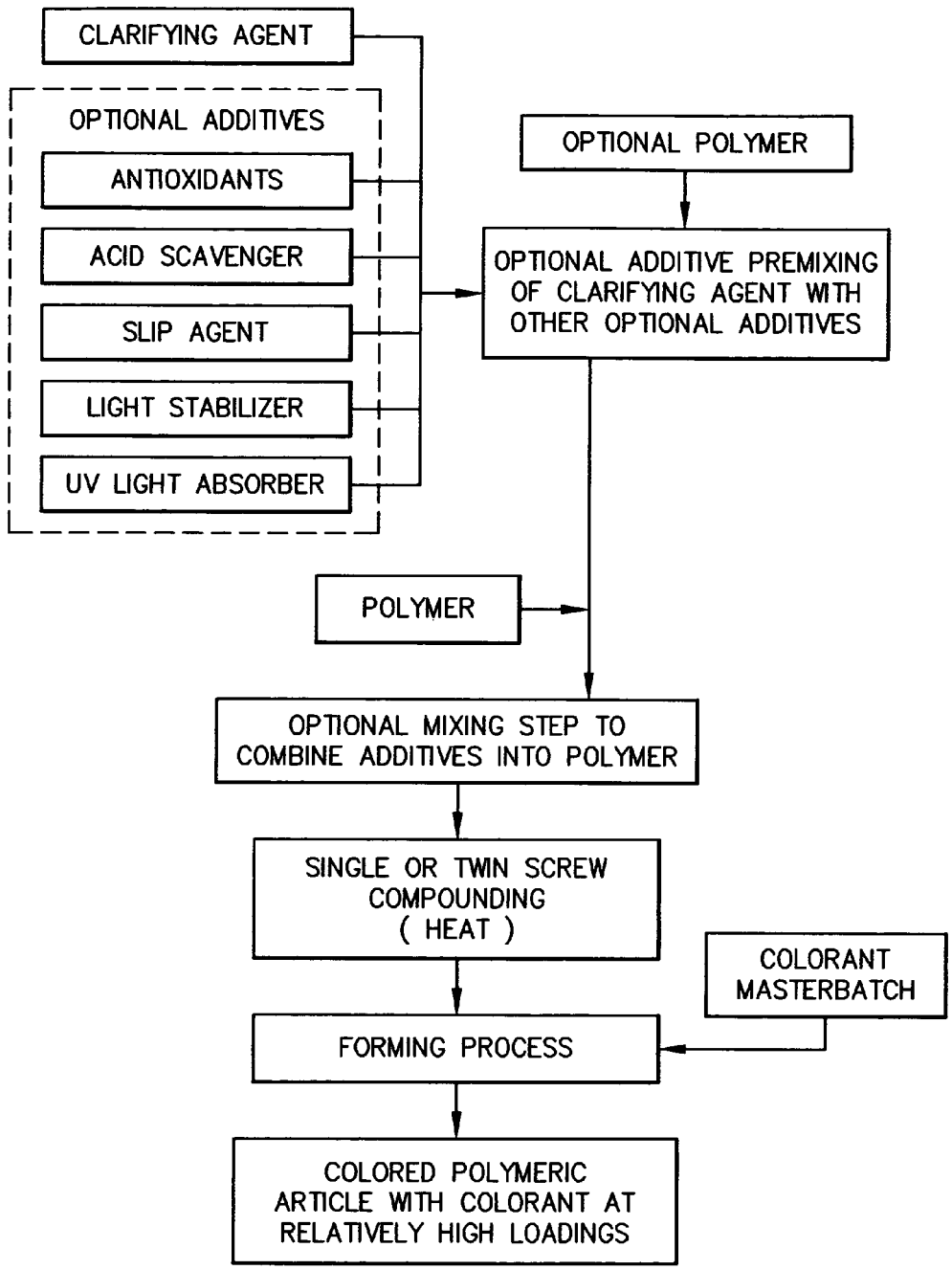
FIG. —1—
CONVENTIONAL COLORED POLYMERIC
ARTICLE MANUFACTURING PROCESS

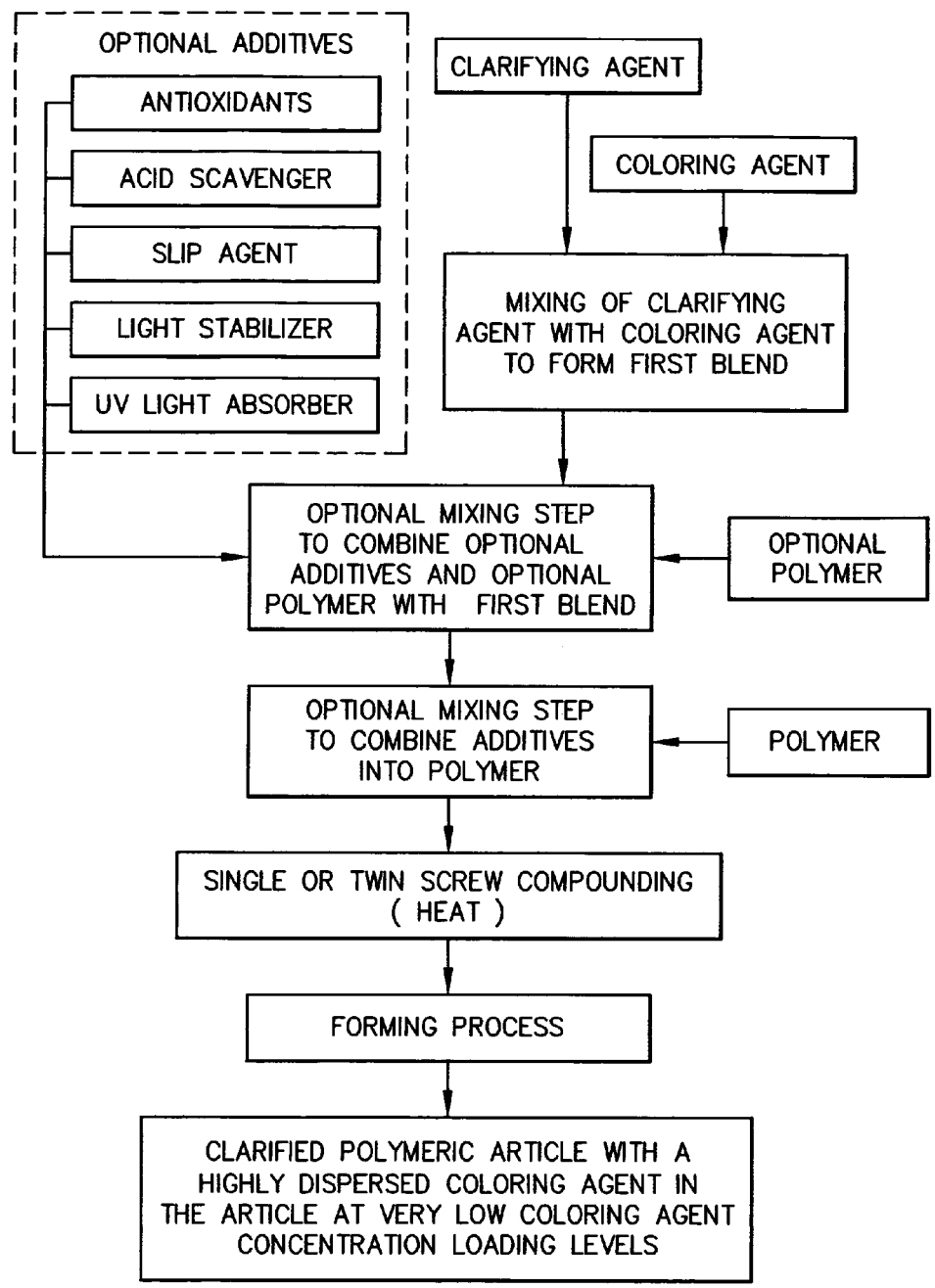
FIG. -2-
USE OF COLORING AGENT TO FORM A FIRST BLEND
IN THE MANUFACTURE OF POLYMERIC ARTICLES

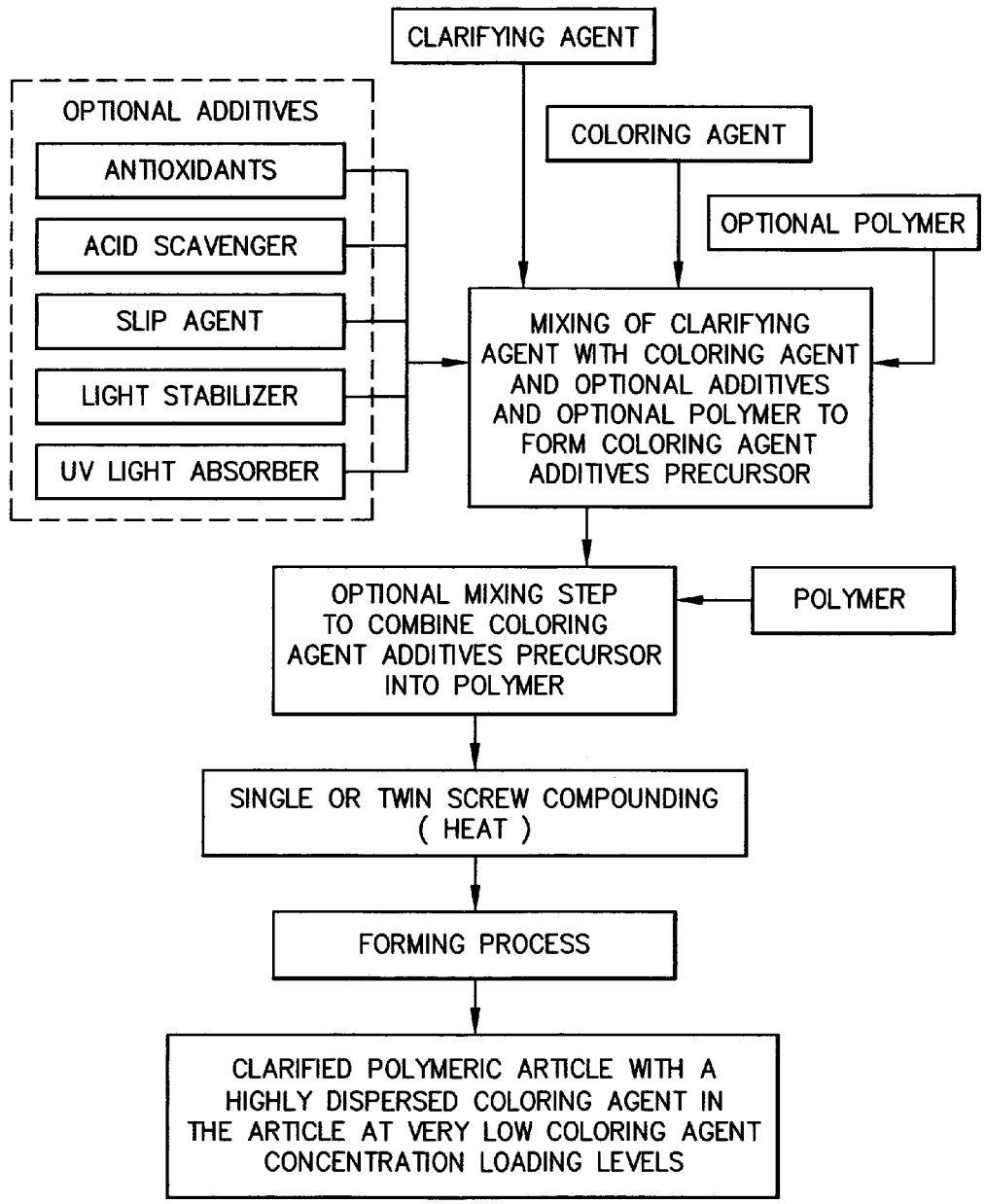
FIG. -3-
USE OF COLORING AGENT TO FORM COLORING
AGENT ADDITIVE PRECURSOR

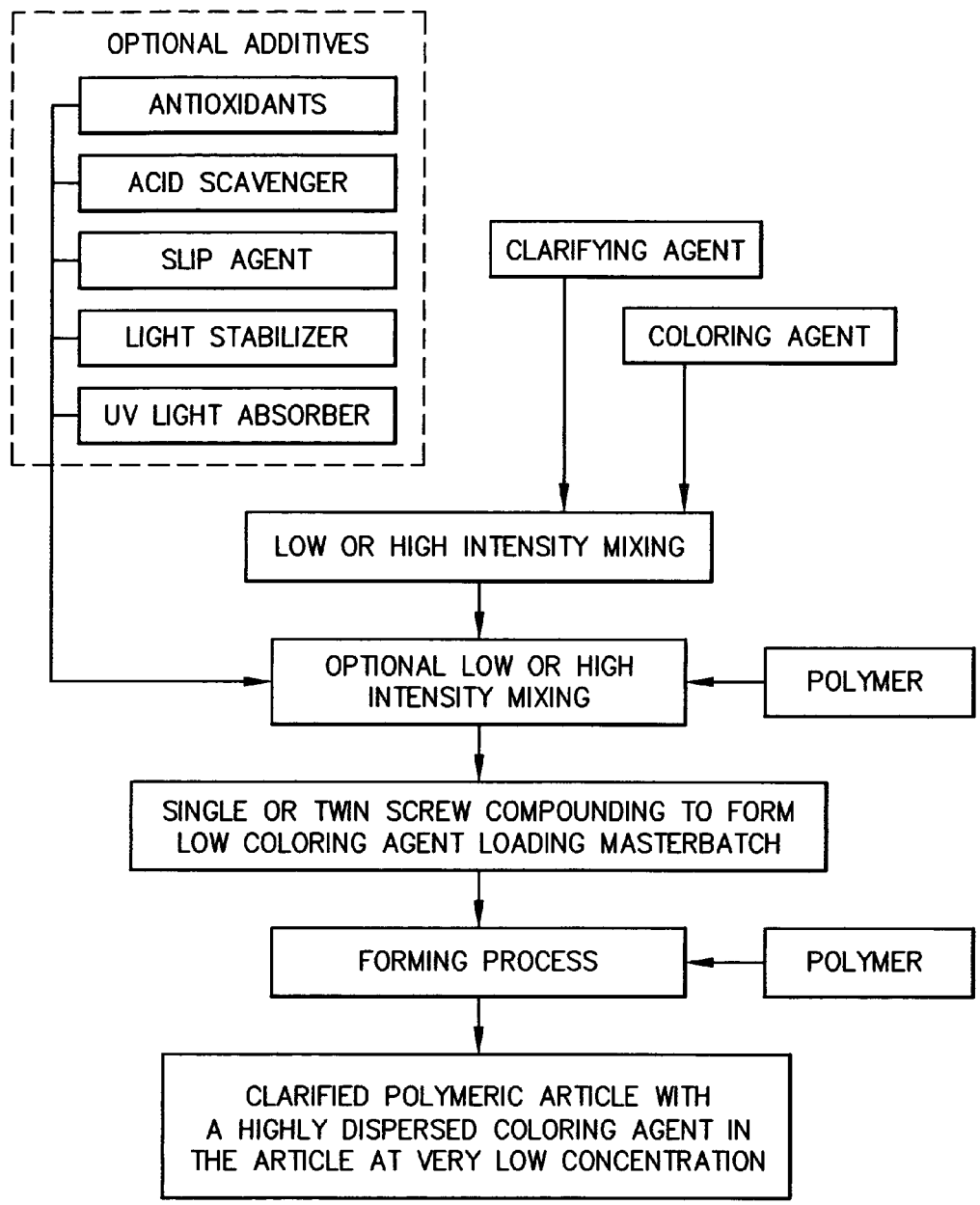
FIG. -4-
MASTERBATCH APPLICATION OF INVENTION

COMPOSITIONS AND METHODS FOR MAKING CLARIFIED AESTHETICALLY ENHANCED ARTICLES

BACKGROUND OF THE INVENTION

Polymers such as polypropylene may be prepared into articles having reduced haze by adding clarifying agents into the polymer. Solid plastic articles such as food storage containers, household plastic products, and the like are commonly rendered clear by the addition of clarifying agents to the polymers. Clarifying agents are commonly added to polymers as part of an "additive package" pre-blend which may contain in addition to clarifying agents one or more of the following: antioxidants, acid scavengers, slip agents, light stabilizers, optical brighteners and UV light absorbers.

Referring now to FIG. 1, in the conventional use of clarifying agents, various customary plastic additives may be combined with a clarifying agent. Then, the mixture may be low or high intensity mixed. A polymer is added, and then the resulting batch may be mixed, followed by heat compounding to form a polymer. A forming process such as injection molding, thermoforming, injection stretch blow molding ("ISBM"), or extrusion blow molding ("EBM") may be accomplished in the manufacture of articles.

Sometimes a coloring agent (which may be in the form of a masterbatch pre-mixed with polymer) is added during or just prior to the forming process, as in FIG. 1. This procedure is one manner in which plastics are colored in the industry. A relatively high colorant loading of 500-1000 parts per million (ppm) may be mixed and adequately dispersed into a plastic in this manner. For loadings in the range of about 500-1000 ppm, this procedure is satisfactory. A conventional process is suitable for applying a high degree of color to make brightly colored plastic articles for everyday use.

It is difficult to adequately disperse an additive into a plastic or polymer at extremely low additive concentration levels. For example, dispersing an additive into a polymer at very low loading levels of additive usually requires several steps. For example, an additive may be added to a polymer in a "let-down" to bring the additive into a range in the range of roughly 10,000 of parts per million (ppm). All ratios are herein by weight unless otherwise specified. Then, another "let-down" step may be needed to bring an additive into a range of a few hundred ppm. Sometimes, a third let-down may be needed to bring an additive to a range of less than about 10 ppm, or less than 5 ppm. Thus, applying additives in a range of only a few ppm must be done in discrete steps, and usually cannot easily be accomplished conventionally using typical manufacturing equipment in only one step. It is difficult to achieve adequate and homogenous dispersion of the additive in the polymer. Dispersion is very difficult to achieve when using very low loadings of an additive. Achieving a very high degree of dispersion at low loadings is difficult and time consuming in most polymer manufacturing applications.

There is a continual search in the industry for additives that will improve the visual appearance or clarity of polymeric articles. In the case of substantially uncolored ("clear") plastic articles, it is common to conduct haze testing to determine the level of haze exhibited by a clarified plastic article or plaque. In general, the visual appearance of a plastic article is commercially significant in the plastics manufacturing industry.

Plastic articles such as storage containers typically are stacked for display in retail stores. When four or five uncolored plastic articles (such as food storage containers) are stacked on a retail shelf, the collective haze of the stack is "multiplied" based upon the number of articles in the stack. Thus, an article (product) that may otherwise appear to be clear when viewed alone may not appear to be nearly so clear when four or five or more like articles are stacked and nested into each other on a store shelf.

Consumers find clear plastic to be highly desirable in many product applications. For example, in the case of storage containers, consumers may desire to see the contents of the container. Containers that are clear may command a premium in the market for storage containers. Additives that improve the visual appearance of plastic are very desirable. Plastic additives that improve the visual appearance of plastic articles when such articles are stacked or nested are very desirable. This invention is addressed to make such improvements.

BRIEF DESCRIPTION OF THE DRAWINGS

A full and enabling disclosure of this invention, including the best mode shown to one of ordinary skill in the art, is set forth in this specification. FIG. 1 illustrates what is believed to be the conventional process for using a clarifying agent and a colorant (and optionally other plastic additives) in the manufacture of a colored polymeric article. FIG. 2 shows one manner of practicing the invention in which a first blend of clarifying agent and coloring agent is made. FIG. 3 shows an alternate embodiment of the invention, in which a coloring agent additive precursor is employed. FIG. 4 shows yet another embodiment in which a low coloring agent loading masterbatch is employed.

DETAILED DESCRIPTION OF THE INVENTION

It has been discovered that very low loadings of coloring agents, when highly dispersed into a polymer, provide enhanced visual benefits to a plastic article made with such polymer. At very low loadings (i.e., less than about 5 ppm by weight), such coloring agents when applied in the practice of the invention usually are not at a high enough concentration to color the plastic article to any significant degree. Thus, the plastic article remains essentially clear, and is termed "substantially non-colored" or "substantially uncolored" as measured by instrumental methods, such as a spectrophotometer.

In some applications, the measured haze (% haze) values are substantially unchanged from the standard control articles made without the coloring agent. However, human test subjects report a very desirable clarity and appearance of such articles. Statistically significant numbers of human observers indicate that articles made in this way are quite clear and visually desirable, even though the percent haze measurement may not be reduced.

The enhanced visual benefit is believed to be due to the presence at very low loadings of coloring agent in the polymer. Coloring agents, which typically are used to impart visible color in such plastics, may in very low loading levels actually make clear plastic appear even more clear. This type of use of coloring agents is contrary to most conventional applications of coloring agents.

The effect of such coloring agents in improving the appearance of the article is most pronounced when the coloring agent is very highly dispersed. Images, such as photographs, placed behind such a plaque (or thin sheet of plastic) sometimes appear to test human subjects to be more vivid and bright than the same images placed behind control plaques made without such highly dispersed coloring agents. The exact mechanism for this visual effect is not known, but the effect has been documented in the course of development of this invention.

A composition is provided comprising a clarifying agent, and a water insoluble coloring agent. The water insoluble coloring agent may be comprised of at least one pigment. The term water insoluble is intended to mean less than about 0.1 grams dissolving in 100 grams of water at room temperature. The ratio of parts of coloring agent to parts of clarifying agent is about 50-10,000 parts to 1 million parts. In one embodiment, the clarifying agent comprises a derivative of dibenzylidene sorbitol. A clarified polypropylene resin composition may be formed by combining the composition with polypropylene. In some specific applications of the invention, the ratio of coloring agent to clarifying agent comprises from about 200-5,000 parts of coloring agent to 1 million parts clarifying agent.

In some applications, the resin composition provides a concentration of coloring agent of less than about 5 ppm of the total resin composition. Further, the resin composition may additionally comprise clarifying agent in a concentration of from about 500 ppm to about 5,000 ppm of the total resin composition. Articles of manufacture may be constructed from the compositions and/or resins.

The water insoluble coloring agent may be a black coloring agent, but black is not required for the coloring agent in the practice of the invention. In one embodiment, as shown in FIG. 3, a coloring agent additive precursor is formed. The precursor is made by combining the first blend with one or more of the following: antioxidants, acid scavengers, slip agents, light stabilizers, UV light absorbers, and/or optical brighteners.

A masterbatch composition may be made (as shown in FIG. 4) by combining a first blend of clarifying agent and coloring agent with a polyolefin, including polypropylene. The masterbatch composition may provide a percentage of clarifier in the masterbatch composition of from about 1% to about 40% weight percent, for some applications. This concentrated colored masterbatch then may be applied in a forming process, which serves to dilute the coloring agent to very low loading levels.

A high clarity polypropylene article may be manufactured comprising highly dispersed carbon black pigment, in which the carbon black pigment is substantially water insoluble. The carbon black pigment may be provided in the article in a loading of from about 0.25 to about 5 ppm of said article.

A high clarity substantially colorless polypropylene article is made by a process of forming a first blend. The first blend is comprised of a clarifying agent and a coloring agent, wherein said first blend is dispersed in successive steps within polypropylene. The coloring agent further comprises at least one pigment, said coloring agent being provided in said article in a concentration loading of from about 0.25 to about 5 ppm of said article.

A coloring agent additive precursor composition also may be provided, in which the precursor composition comprises a clarifying agent, and a water insoluble coloring agent. The water insoluble coloring agent is comprised of at least one pigment. The composition further comprises a ratio of about 50-10,000 parts of coloring agent to 1 million parts clarifying agent. The composition employs at least one other additive. The other additive is selected from the group of: antioxidants, acid scavengers, slip agents, light stabilizers, optical brighteners, and UV light absorbers. The coloring agent additive precursor as defined may be used or mixed with a polymer such as polypropylene. A clarified polypropylene resin composition may be formed by combining the composition with polypropylene, the resin composition having a concentration of coloring agent of less than about 5 ppm of the total resin composition. Such resin composition additionally may comprise a clarifying agent in a concentration of from about 500 ppm to about 5,000 ppm of the total resin composition. An article of manufacture of the resin compositions as defined above may also be formed in the method of practicing the invention.

A method of making a clarified thermoplastic article with a highly dispersed coloring agent is disclosed in the practice of the invention. The method relates to the use of a clarifying agent and a coloring agent, in which the coloring agent provides at least one pigment. Then, the coloring agent is mixed with the clarifying agent to form a first blend. The first blend is mixed with polymer to form a compounded resin composition. It is possible in this manner to make clarified thermoplastic articles with highly dispersed coloring agent in said articles, providing improved consumer appeal, and improved appearance. The coloring agent employed in the method may be provided in a loading of from about 0.25 to about 5 ppm of said article. The coloring agent may be a water insoluble coloring agent. For many applications, the clarifying agent is a derivative of DBS. The articles of manufacture resulting from the method may be made from one of many forming processes, including for example the following forming processes: injection molding, extrusion blow molding, injection stretch blow molding, and thermoforming.

Low loadings of such coloring agents may be dispersed into a polymer using many different methods. However, achieving high dispersion is a significant challenge. As shown in FIG. 2, one method of achieving an adequate dispersion of coloring agents in such articles is achieved by applying a clarifying agent with the coloring agent to first form a clarifying agent/colorant blend, or "first blend". The first blend typically is particulate in form. The first blend may optionally be combined with polymer, or with an additive "package" (i.e., antioxidants, acid scavengers, slip agents, light stabilizers, optical brighteners, and/or UV absorbers). The first blend and the optional items may be mixed in a mixer. Whether or not this mixing step is practiced, a next step is the addition of optional polymer, which has the effect of further dispersing the coloring agent. Then, the mixture is employed in a single or twin screw compounding step, using the application of heat. Formation of pellets is common, and such pellets then may be stored for a time, or alternately employed immediately in a forming process. The result is a clarified polymeric article with a highly dispersed coloring agent in the article at very low loadings.

In general, the use of a first blend of clarifying agent with coloring agent as in FIG. 2 has substantial advantages. The use of the first blend (i.e., which includes at least clarifying agent and coloring agent) tends to achieve a greater dispersion at very low loadings. Further, articles made using this first blend have improved visual appearance. Thus, the technique of using such a first blend is believed to be advantageous.

An alternate manner of practicing the invention is shown in FIG. 3. This figure shows the mixture of a clarifying agent, a coloring agent, and an optional amount of polymer (and with optional additives) to form a coloring agent additive precursor. The optional additives may be a typical additive package, including one or more of the following: antioxidants, acid scavengers, slip agents, light stabilizers, and/or UV light stabilizers, optical brighteners. The precursor must include either polymer or optional additive. The coloring agent additive precursor then is optionally mixed with polymer and then compounded. A forming process employs the pellets to produce a clarified polymeric article with a highly dispersed coloring agent in the article at very low loading levels.

Yet another embodiment of the invention is illustrated in FIG. 4. This figure shows an application of the invention that relates the manufacture of a low coloring agent loading masterbatch. That is, a masterbatch of polymer which has a low amount of coloring agent as compared to a typical masterbatch for such applications. In this process, a clarifying agent is combined with a coloring agent (and optionally, with some amount of polymer) and then mixed. The mixed result may be mixed in yet another step with polymer, to further disperse the coloring agent. Compounding follows, with heat applied to form a low coloring agent masterbatch. Then, the masterbatch may be formed into pellets for future use, or may alternately be applied immediately to a forming process. In the forming process, a polymer is added to form a clarified polymeric article having therein a highly dispersed coloring agent in the article at very low concentration.

Pigments and Dyes

Coloring agents other than carbon black are commonly used in thermoplastics and are useful in the practice of the invention. Pigments may be generally classified as organic or inorganic, and carbon black is one example of an inorganic pigment. In the practice of the invention, a water insoluble coloring agent having of at least one pigment is employed.

Dyes also may be employed broadly in thermoplastics. However, dyes are known to migrate from plastics, which is undesirable. Dyes usually have no affinity chemically for polyolefins, making them generally unsuitable for applications such as food contact packaging or children's toys, especially when used in high loadings to yield dark shades. Thus, dyes are generally less suitable than pigments for application in the invention. Although it is possible to use a dye in combination with one or more pigments in the practice of the invention, the invention is most likely to provide advantageous benefits when pigments are employed. Carbon black is one type of pigment that has been found to be quite suitable in the practice of the invention.

A black color in thermoplastics can be obtained by a single coloring agent, such as carbon black. It can also be obtained by blending several different colored pigments and/or dyes with certain characteristics to yield the desired black color. The pigments employed in the invention may be black, purple, or blue, but black is believed to be particularly suitable. In most applications, at least one pigment must be present in the coloring agent applied in the practice of the invention.

Coloring agents can be employed in the invention in which a pigment forms at least a part of (if not all of) the coloring agent. Mixtures of pigments and dyes, however, could be employed as the coloring agent. One coloring agent, "Holcoprill", which is shown in the attached examples, has been found to be effective in this application. This is further discussed in connection with examples in this specification. This product is commercially sold by the Holland Colors Company of Appledorn, Netherlands. This "Holcoprill" coloring agent is believed to be a mixture or blend of at least one dye and at least one pigment.

The blend of pigments and dyes is dispersed into and held together by a thermoplastic binder, making the coloring agent easier to disperse into the subsequent resin formulation than a pigment by itself would be. A coloring agent in a thermoplastic binder offers another benefit, being the ability to easily control its particle size. By making a smaller particle size the coloring agent can be made to disperse more easily into the subsequent resin formulation. By making the coloring agent with a larger particle size, it has been found that the color of the first blend can be kept substantially free of color or white. Prior art examples employing water soluble or miscible dyes demonstrate that the resulting blends with the clarifier are substantially gray in color, which is less desirable to those using the clarifier in the industry. Therefore, the ability to balance the particle size of the coloring agent; keeping it small enough to effect good dispersion in the final resin and big enough to keep the first blend substantially free of color, that is white, can be especially practiced when the particle size of the coloring agent can be easily modified and controlled, as is the case with a thermoplastic binder.

Other pigments can be effectively used in connection with the practice of the invention. For example, carbon black alone or combined with other coloring agents or optical brighteners can be effectively employed.

It is further believed that coloring agents which comprise non-water soluble species are particularly useful, as non-water soluble species are more likely to achieve United States Food and Drug Administration (FDA) or other regulatory approval for use in products that contact food or medicine for human consumption. Water insoluble coloring agents are generally less likely to migrate (or "extract") out of the manufactured plastic article, thereby providing substantial benefits compared to less desirable water soluble coloring agents. Thus, one aspect of the invention is the employment of water insoluble coloring agents in the practice of the invention.

Carbon Black

Carbon black is a pigment of an elemental carbon in a form that is different from diamond, cokes, charcoal and graphite. It consists of generally spherical particles having fine particle size.

Carbon black is a commercial product manufactured by thermal decomposition or incomplete combustion of carbon hydrogen compounds. Carbon black has a well-defined morphology with a minimum content of tars or other extraneous materials, and is generally water insoluble.

Cabot Corporation of Massachusetts, USA manufactures carbon black by subjecting heavy residual oil feedstock to extremely high temperatures in a carefully controlled combustion process. Carbon black is often mistakenly thought of as a form of soot, but carbon black is manufactured under controlled conditions, whereas soot is randomly formed. The two can be distinguished by analyzing tar, ash content and impurities. Carbon black is used as a pigment for inks, paints, and toners, in plastics applications such as conductive packaging, films, fibers, moldings, and pipes, in marine, aerospace and industrial coatings, and in tires and industrial rubber products.

Particulate carbon black typically is manufactured by the incomplete combustion of a heavy aromatic feedstock in a hot flame of (preheated) air and natural gas. The primary "units" of carbon black are aggregates, which are formed when particles collide and fuse together in the combustion zone of a reactor. Several of those aggregates may be held together by weak forces to form agglomerates. A broad range of carbon black types can be made by controlled manipulation of reactor conditions. The invention is not limited to any particular type of carbon black, and essentially any known commercial type of carbon black could be employed in the practice of the invention.

Thermoplastic

As used herein, the term "thermoplastic" refers generally to a polymeric or polymer material that will melt upon exposure to sufficient heat but will regain its solidified state upon cooling. "Thermoplastic" is used interchangeably herein with "polymer", or "polymeric". Particular types of polymers contemplated within such a definition include, without limitation, polyolefins (such as polyethylene, polypropylene, polybutylene, and any combination thereof), polyamides (such as nylon), polyurethanes, polyester (such as polyethylene terephthalate), and the like (as well as any combinations thereof).

Thermoplastics have been utilized in a variety of end-use applications, including storage containers, medical devices, food packages, plastic tubes and pipes, shelving units, and the like. Such base compositions, however, must exhibit certain physical characteristics in order to permit widespread use. Specifically within polyolefins, for example, uniformity in arrangement of crystals upon crystallization is a necessity to provide an effective, durable, and versatile polyolefin article. In order to achieve such desirable physical properties, it has been known that certain compounds and compositions provide nucleation sites for polyolefin crystal growth during molding or fabrication. Generally, compositions containing such nucleating compounds crystallize at a much faster rate than un-nucleated polyolefin. Such compounds and compositions that provide faster and or higher polymer crystallization temperatures are popularly known as nucleators. Such compounds provide nucleation sites for crystal growth during cooling of a thermoplastic molten formulation.

Clarifying Agents

The use of clarifying agents may increase the crystallization temperature and the crystallization rate in the practice of the invention. Compositions containing such clarifying compounds crystallize at a much faster rate than non-nucleated polyolefins. However, these agents are used as well for their clarifying effect upon the final formed articles, which are of low haze and therefore are desirable.

Clarifying agents also sometimes provide nucleation sites for crystal growth during cooling of a thermoplastic molten formulation. The presence of such nucleation sites results in a larger number of smaller crystals. As a result of the smaller crystals formed therein, clarification of the target thermoplastic may be achieved. However, excellent clarity is not always a result. The more uniform (and smaller) the crystal size, the less light is scattered. Thus, the clarity of the thermoplastic article itself may be improved. Thus, thermoplastic clarifier compounds are important to the industry, as they may provide enhanced clarity, improved physical properties and faster processing.

DIBENZYLIDENE sorbitol derivatives are clarifying compounds, commonly used in polypropylene end-products. These are typically sold in particulate form. Compounds such as 1,3-O-2,4-bis(3,4-dimethylbenzylidene) sorbitol (hereinafter "DMDBS"), available from Milliken and Company under the trade name Millad® 3988, provide excellent nucleation and clarification characteristics for polypropylene. Other DBS-based clarifying compounds can be employed, including those with other groups substituted on the sorbitol portion of the molecule, or upon the benzene ring portion of the molecule.

Other clarifying agent compounds could be employed, such as aluminum bis[2,2'-methylene-bis-(4,6-di-tert-butylphenyl)phosphate] (from Adeka Palmarole SAS of France, known as "NA-21™"). In general, essentially any clarifying agent could be employed in the practice of the invention.

The invention is not limited to the use of clarifying agents which are DBS derivatives, although it is believed that the invention may be practiced in a most advantageous manner using DBS derivatives.

Forming Processes and Applications

Injection Molding. A basic principle of injection molding is the ability of a thermoplastic to be softened by heating and forced under pressure into a mold cavity that is clamped together. The result is a thermoplastic that is solidified into the shape of the mold, thus creating the part. Resin pellets may be poured into a feed hopper, a large open bottomed container, which feeds the pellets down to the screw. As a motor turns the screw, the pellets are moved forward where they undergo extreme pressure and friction which, along with heaters around the screw, generate the heat that melts the pellets. Back pressure can be supplied from a hydraulic pump, to the screw as it melts the plastic to apply more energy resulting in more mixing of the melted plastic. The melted resin is forced out the other end of the cylinder through a nozzle (injection process) into a relatively cool mold, held closed by the clamping mechanism. The melt cools and hardens, and the mold opens, ejecting the molded part. Injection molding is widely used for manufacturing a variety of parts, from the smallest component to entire body panels of cars, for example.

Extrusion Blow Molding (EBM). In extrusion blow molding, plastic is melted and extruded into a hollow tube (called a parison). The parison is then captured by closing it into a cooled metal mold. Pressurized air is blown into the parison, inflating it into the shape of the mold. After the plastic has cooled sufficiently, the mold is opened and the part is ejected.

Blow molding is intended for use in manufacturing hollow plastic parts. Its main advantage is the ability to produce hollow shapes without having to join two or more separately molded parts. Examples of parts made by the EBM process include dairy containers, shampoo bottles, and hollow industrial parts such as drums. Extrusion is the process of compacting and melting a plastic material and forcing it through an orifice in a continuous fashion. Material is moved through the heated machine barrel by a helical screw (or screws), where it is heated and mixed to a homogeneous state and then forced through a die of the shape required for the finished product.

Injection Stretch Blow Molding (ISBM). In the injection stetch blow molding process, the plastic is first molded into a preform using the injection molding process then stretched and blown into a bottle. This process can take place all in one stage, or the process can be two stages, with the preform being allowed to cool between the stages. In the two-stage system, the molded preforms are reheated (typically using infared heaters) and stretched with a core rod while the bottles are being blown in two pressure stages. The stretching of some polymers results in strain hardening of the resin, allowing the bottles to resist deforming under the pressure formed by carbonated beverages. The main applications of this method are bottles, jars, and other containers.

Thermoforming (TF). Thermoforming is a process of forming thermoplastic sheet or film into a part. The sheet or film passes between heaters to its forming temperatures, then it is stretched over or into a temperature-controlled, single surface mold. The sheet is held against the mold surface until cooled, and then the formed part is trimmed from the sheet. The sheet can be formed to the contours of a mold by mechanical means (e.g., tools, plus, solid molds, etc.) or pneumatic means (e.g., pulling a vacuum or pushing with compressed air).

Examples of thermoformed products are plastic or foam dinnerware, cups, meat and produce trays, egg cartons, refrigerator liners, computer housings, interior and exterior automotive parts, blisters for packaging, and others.

EXAMPLES 1-10

Preparation of Clarifier First Blends and Addition to Polypropylene Resin

One hundred (100.0) grams of clarifying agent was blended with a coloring agent on a Cuisinart Classic food processor (Model DFP-14BCN) for approximately 0.5-1.0 minutes.

TABLE 1

Clarifier First Blends

| Example | Clarifier Type | Coloring Agent Type | Coloring Agent Amount | Ratio of Color Agent to Clarifier (ppm) |
|---|---|---|---|---|
| 1 | Millad ® 3988 | None | 0 | 0 |
| 2 | Millad ® 3988 | Cabot Black Pearls 4350 | 0.100 g | 1000 |
| 3 | Millad ® 3988 | Columbian Chemicals Raven 410 | 0.100 g | 1000 |
| 4 | Millad ® 3988 | Holland Color Holcobatch 932216 | 0.250 g | 2500 |
| 5 | Millad ® 3988 | Holland Color Holcoprill 175.1767 | 0.250 g | 2500 |
| 6 | NA-21 | None | 0 | 0 |
| 7 | NA-21 | Cabot Black Pearls 4350 | 0.100 g | 1000 |
| 8 | NA-21 | Holland Color Holcobatch 932216 | 0.250 g | 2500 |
| 9 | Millad ® 3940 | None | 0 | 0 |
| 10 | Millad ® 3940 | Columbian Chemicals Raven 410 | 0.100 g | 1000 |

Note:
"Millad" and "Millad 3988" are registered trademarks of Milliken and Company.
"NA-21" is a trademark and product of Adeka Palmarole SAS of France.

The clarifying agent and coloring agent blend (clarifier first blend) were mixed with 500 grams of an 11 MFR (Melt Flow Rate or Index) polypropylene random copolymer resin (Basell SA-849) and standard additive package (i.e., 500 ppm Irganox 1010, 1000 ppm Irgafos 168, and 800 ppm Calcium Stearate, CaSt) using a Gardner ribbon blender for five minutes at approximately 200-220 rpm (Speed Setting 5). The blend was then melt compounded on a Prism 16 mm diameter, 25:1 L/D co-rotating twin screw extruder. The melt-compounded resin was injection molded using a 40-ton Arburg AllRounder 221K to produce twenty 2.00"×3.00"×0.05" test plaques, which were collected in sequential order. The resin was processed on the molder using a 230° C. flat profile barrel temperature and no backpressure. The L color value was then evaluated for each plaque using a Gretag MacBeth Color-Eye 7000A color computer to determine plaque-to-plaque shade variation, as measured by the standard deviation of the L values. $L^*$ is a measurement of color on the white to black scale. It ranges from a maximum value of 100 for pure white to 0 for pure black. The evaluation of its standard deviation over a series of 20 sequential plaques is a direct measure of the dispersion of the colors agent. This measurement was taken in reflectance mode with a large area view using a cool white fluorescent light source and a 10° observer. Percent haze was measured using a BYK Gardner Hazegard Plus hazemeter according to ASTM D1003.

TABLE 2

Incorporation of Clarifier First Blend into Polypropylene Resin

| Example | Clarifier First Blend | L* Average | L* Standard Deviation | % Haze | Clarifier in final resin, ppm | Coloring agent in final resin, ppm |
|---|---|---|---|---|---|---|
| 1 | 1.0 g | 90.931 | 0.028 | 9.5 | 2000 | 0 |
| 2 | 1.0 g | 89.635 | 0.031 | 10.1 | 2000 | 2 |
| 3 | 1.0 g | 89.619 | 0.034 | 9.9 | 2000 | 2 |
| 4 | 1.0 g | 88.929 | 0.061 | 9.7 | 2000 | 5 |
| 5 | 1.0 g | 87.837 | 0.141 | 9.4 | 2000 | 5 |
| 6 | 1.0 g | 90.383 | 0.026 | 15.0 | 2000 | 0 |
| 7 | 1.0 g | 88.297 | 0.029 | 14.7 | 2000 | 2 |
| 8 | 1.0 g | 89.680 | 0.023 | 14.8 | 2000 | 5 |
| 9 | 1.0 g | 90.851 | 0.035 | 10.6 | 2000 | 0 |
| 10 | 1.0 g | 89.762 | 0.042 | 10.7 | 2000 | 2 |

EXAMPLE 11-12

Preparation of Coloring Agent Additive Precursor and Addition to Polypropylene Resin A clarifying agent, coloring agent, and a standard additive package were mixed together using a food processor as described in examples 1-10 with the mixing time listed in the Table 3 below.

TABLE 3

Coloring Agent Additive Precursor

| | Example 11 | Example 12 |
|---|---|---|
| Clarifier Type | Millad ® 3988 | NA-21 |
| Clarifier Amount | 46.490 g | 46.460 g |
| Coloring Agent Type | Columbian Chemicals Raven 410 | Holland Color Holcobatch 932216 |
| Coloring Agent Amount | 0.046 g | 0.116 g |
| Ratio of Coloring Agent to Clarifier (ppm) | 989 | 2497 |
| Irganox 1010 Amount | 11.630 g | 11.610 g |
| Irgafos 168 Amount | 23.250 g | 23.230 g |
| Calcium Stearate Amount | 18.600 g | 18.580 g |
| Mixing Time (minutes) | 1.00 | 3.00 |

The clarifying agent, coloring agent, and standard additive package blend were then mixed with 500 grams of an 11 MFR polypropylene random copolymer resin using a ribbon blender according to the method described in examples 1-10. The blend was then melt compounded on a twin screw extruder and injection molded to produce twenty 2.00"×3.00"0.05" test plaques according to the process described in examples 1-10. The $L^*$ color values were then evaluated using a Gretag MacBeth color computer as described in examples 1-10 to determine plaque-to-plaque shade variation. Percent haze was measured using a BYK Gardner Hazegard Plus hazemeter according to ASTM D1003.

TABLE 4

Incorporation of coloring agent additive precursor into polypropylene resin

| | Example 11 | Example 12 |
|---|---|---|
| Coloring Agent Additive Precursor Amount | 2.15 g | 2.15 g |
| Final Clarifier Loading (ppm) | 1999 | 1998 |

TABLE 4-continued

Incorporation of coloring agent additive precursor into polypropylene resin

| | Example | |
|---|---|---|
| | 11 | 12 |
| Final Coloring Agent Loading (ppm) | 1.98 | 4.99 |
| L* Average | 89.778 | 89.305 |
| Standard Deviation | 0.028 | 0.048 |
| % Haze | 9.6 | 14.6 |

EXAMPLES 13-14

Preparation of Low Coloring Agent Loading Masterbatch and Addition to Polypropylene Resin Fifty (50.0) grams of Millad® 3988, a clarifying agent; coloring agent; and a cryoground 11 MFR polypropylene random copolymer powder (Total 7620Z) were mixed together on a Cuisinart Classic food processor (Model DFP-14BCN) for approximately five minutes. The blend was then melt-compounded on a twin-screw extruder according to the method described in examples 1-10.

TABLE 5

Low Coloring Agent Loading Masterbatch

| Example | 11 MFR Polypropylene Random Copolymer | Coloring Agent Type | Coloring Agent Amount | Ratio of Coloring Agent to Clarifier (ppm) |
|---|---|---|---|---|
| 13 | 450.0 g | None | N/A | N/A |
| 14 | 449.95 g | Columbian Chemicals Raven 410 | 0.05 g | 1000 |

The concentrate blend was then mixed with 980 grams of an 11 MFR polypropylene random copolymer pelletized resin containing a standard additive package (i.e. 500 ppm Irganox 1010, 1000 ppm Irgafos 168, and 800 ppm CaSt) on a Kitchen Aid mixer for five minutes on the stir setting. The blend was then injection molded to produce twenty 2.00"× 3.00"×0.05" test plaques according to the process described in examples 1-10. During injection molding 350 bar backpressure was also used to improve dispersion. The L color values were then evaluated using a Gretag MacBeth color computer as described in examples 1-10 to determine plaque-to-plaque shade variation. Percent haze was also measured using a BYK Gardner Hazegard Plus hazemeter according to ASTM D1003.

TABLE 6

Incorporation into Polypropylene Resin

| | Low Color Agent Loading | L* | | |
|---|---|---|---|---|
| Example | Masterbatch | Average | Standard Deviation | % Haze |
| 13 | 20.0 g | 91.230 | 0.217 | 9.6 |
| 14 | 20.0 g | 90.016 | 0.028 | 12.8 |

EXAMPLE 15

A total of 15 panelists were given a pair of plaques for comparison where one plaque contained a black colorant and the other plaque did not contain a black colorant. The composition of the plaques was not given to the panelists; they were not told which sample contained the black colorant. The plaques were mounted in a frame in order to eliminate any edge effect with the black colorant and to keep the plaques in a controlled alignment for the subsequent evaluation. The panelists were then asked which plaque appears clearer and makes the background seem more vivid. Backgrounds of white print on black and black print on white as well as colored backgrounds were provided to the panelists for comparison.

This pair wise comparison was conducted with plaques of Patent Example 1 (without black coloring agent) and of Patent Example 4 (with black coloring agent). Results indicated that 13 out of the 15 panelists chose the plaque containing the black colorant as the plaque that appeared clearer and made the backgrounds more vivid. At a 96% confidence level (statistically), the plaque containing the black colorant was found to be visually more appealing.

Effect of Coloring Agent on Color of First Blend

The clarifier first blend powders from Patent Examples 1, 4, and 5 were placed in a quartz 62 mm×32 mm×13.5 mm cuvette. The powder was packed down into the cuvette to create a smooth surface of powder against the surface of the cuvette. The L* color value was then evaluated for each powder sample in the cuvette using a Gretag MacBeth Color-Eye 7000A color computer. L* is a measurement of color on the white to black scale. It ranges from a maximum value of 100 for pure white to 0 for pure black. This measurement was taken in reflectance mode with a large area view using a cool white fluorescent light source and a 10° observer.

TABLE 7

L* Values for First Blend Powders

| Example | Clarifier First Blend Powder | L* |
|---|---|---|
| 16 | Composition from Patent Example 1 | 96.6 |
| 17 | Composition from Patent Example 4 | 96.3 |
| 18 | Composition from Patent Example 5 | 96.0 |

The first blends of the invention may exhibit an L* value of greater than 85. Sometimes, the L* value is greater than 90, wherein the first blend may be substantially white in color. Further, this example 16-18 of Table 7 above shows that incorporation of the coloring agent into the clarifier maintains the substantially white color of the first blend, which is commercially desirable.

COMPARATIVE EXAMPLES 1-3 USING TECHNIQUE OF APPLYING CLARIFYING AGENT, COLORING AGENT, AND OTHER ADDITIVES INTO A COPOLYMER WITHOUT THE USE OF A FIRST BLEND

A clarifying agent, coloring agent, standard additive package (i.e., 500 ppm Irganox 1010, 1000 ppm Irgafos 168, and 800 ppm CaSt) and 1000 grams of an 11 MFR random copolymer were mixed together on a Cuisinart Classic food processor (Model DFP-14BCN) for approximately 0.5-1.0 minute, substantially as shown in FIG. 1. The copolymer with additives was then melt compounded on a Prism 16 mm diameter, 25:1 L/D co-rotating twin screw extruder.

TABLE 8

Clarifier/Coloring Agent Masterbatch Blend

| Example | Clarifier Type | Clarifier Amount | Coloring Agent Type | Coloring Agent | 11 MFR PP Random Copolymer | Ratio of coloring agent to clarifier, ppm |
|---|---|---|---|---|---|---|
| 1 | Millad® 3988 | 2.0 g | Cabot Black Pearls 4350 | 0.1 g | 1000.0 g | 50,000 |
| 2 | Millad® 3988 | 2.0 g | Columbian Chemicals Raven 410 | 0.1 g | 1000.0 g | 50,000 |

The clarifier/coloring agent masterbatch was then mixed with an 11 MFR polypropylene random copolymer pelletized resin containing Millad 3988 (2000 ppm) and a standard additive package (i.e., 500 ppm Irganox 1010, 1000 ppm Irgafos 168, and 800 ppm CaSt) on an Artisan Kitchen Aid mixer for five minutes on the stir setting. The blended resin was injection molded using a 40-ton Arburg AllRounder 221K to produce twenty 2.00"×3.00"×0.05" test plaques, which were collected in sequential order. The resin was processed on the molder using a 230° C. flat profile barrel temperature and 350 bar backpressure to improve dispersion. The L* color value was then evaluated for each plaque using a Gretag MacBeth Color-Eye 7000A color computer to determine plaque-to-plaque shade variation. This measurement was taken in reflectance mode with a large area view using a cool white fluorescent light source and a 10° observer. Percent haze was also measured using a BYK Gardner Hazegard Plus hazemeter according to ASTM D1003.

TABLE 9

Incorporation into Polypropylene (PP) Resin

| | Example | | |
|---|---|---|---|
| | 1 | 2 | 3 |
| Coloring Agent/Clarifier Masterbatch Blend | 20.0 g | 20.0 g | None |
| 11 MFR Polypropylene Random Copolymer with Millad 3988 and standard additive package | 980.0 g | 980.0 g | 1000.0 g |
| L* Average | 89.922 | 90.580 | 91.658 |
| Std dev | 0.390 | 0.152 | 0.019 |
| % Haze | 7.6 | 8.0 | 7.7 |
| Final clarifier loading, ppm | 2000 | 2000 | 2000 |
| Final coloring agent loading, ppm | 2 | 2 | 0 |

Comparative examples 1-3 show the results of compounding the black coloring agent into a masterbatch, and then forming an article in the injection molding process. Comparative example 1 can be compared directly to patent example 2, as they are the same final composition. Both examples result in approximately the same drop in L* value from the addition of the coloring agent at low loading. The standard deviation of the L* value is much higher in comparative example 1, indicating that the dispersion of the coloring agent is not as good, resulting in a variation of the color of the final articles, which is not desirable. This is despite the use of back pressure during injection molding the articles, which is an industry standard method of improving dispersion.

Furthermore, comparative example 2 can be directly compared to patent examples 3, 11, and 14; prepared by the clarifier first blend method, coloring agent additive precursor method, and the low coloring agent loading masterbatch method, respectively. Each of these examples results in the same final composition in the final part, differing in the method by which they are prepared. All examples result in approximately the same drop in L* value from the control resin with no coloring agent. The standard deviation of the L* value is much higher in comparative example 2, indicating that the dispersion of the coloring agent is not as good, resulting in a variation of the color of the final articles, which is not desirable.

COMPARATIVE EXAMPLES 4-5 EMPLOYING A COLORING AGENT MASTERBATCH

A coloring agent and a 30 MFR random copolymer resin (Total 6823MZ) clarified with Millad 3988 at approximately 1800 ppm were mixed together on an Artisan Kitchen Aid mixer for five minutes on the stir setting. The copolymer mixture was then melt compounded on a Prism 16 mm diameter, 25:1 L/D co-rotating twin screw extruder.

TABLE 10

Coloring Agent/Clarifier Masterbatch

| Example | Total 6823MZ | Coloring Agent Type | Coloring Agent Amount | Ratio of coloring agent to clarifier ppm |
|---|---|---|---|---|
| 4-1 | 495.0 g | Holland Color Holcobatch 932216 | 5.0 g | 5,611,672 |
| 5-1 | 495.0 g | Holland Color Holcoprill 175.1767 | 5.0 g | 5,611,672 |

The coloring agent/clarifier masterbatch blend and a 30 MFR random copolymer resin clarified with Millad 3988 (Total 6823MZ) were mixed together on a Kitchen Aid mixer for five minutes. The blend was then melt compounded on a Prism 16 mm diameter, 25:1 L/D co-rotating twin screw extruder.

TABLE 11

Final Clarifying Agent Masterbatch Blend

| Example | Total 6823MZ | Clarifying Agent Masterbatch Blend Amount | Ratio of coloring agent to clarifier, ppm |
|---|---|---|---|
| 4-2 | 495.0 g | 5.0 g | 56,117 |
| 5-2 | 495.0 g | 5.0 g | 56,117 |

The final clarifying agent masterbatch blend was then mixed with an 11 MFR polypropylene random copolymer pelletized resin containing Millad 3988 (2000 ppm) and a standard additive package (i.e. 500 ppm Irganox 1010, 1000 ppm Irgafos 168, and 800 ppm CaSt) on an Artisan Kitchen Aid mixer for five minutes. The blended resin was injection molded using a 40-ton Arburg AllRounder 221K to produce twenty 2.00"×3.00"×0.05" test plaques, which were collected in sequential order. The resin was processed on the molder using a 230° C. flat profile barrel temperature and 350 bar backpressure to ensure optimum dispersion. The L* color value was then evaluated for each plaque using a Gretag MacBeth Color-Eye 7000A color computer to determine plaque-to-plaque shade variation. This measurement was taken in reflectance mode with a large area view using a cool white fluorescent light source and a 10° observer. Percent haze was also measured using a BYK Gardner Hazegard Plus hazemeter according to ASTM D1003.

TABLE 12

Incorporation into PP Resin

| | Example | |
|---|---|---|
| | 4-2 | 5-2 |
| Final clarifying agent masterbatch blend | 20.0 g | 20.0 g |
| 11 MFR Polypropylene Random Copolymer with Millad 3988 and standard additive package | 980.0 g | 980.0 g |
| L* Average | 90.339 | 89.714 |
| Standard deviation | 0.118 | 0.209 |
| Final clarifier loading, ppm | 2000 | 2000 |
| Final coloring agent loading, ppm | 2 | 2 |
| % haze | 7.6 | 7.6 |

Comparative examples 4-5 show the results of compounding the black coloring agent into a masterbatch, and then forming an article in the injection molding process. Comparative example 4 can be compared directly to patent examples 4 and 12; prepared by the clarifier first blend method (FIG. 2 herein) and the coloring agent additive precursor method (FIG. 3 herein), respectively. Each of these examples results in the same final composition in the final part and they result in approximately the same drop in L* value from the addition of the coloring agent at low loading. The standard deviation of the L* value is much higher in comparative example 4, indicating that the dispersion of the coloring agent is not as good in comparative example 4, resulting in a variation of the color of the final articles, which is not desirable. This occurred despite the use of back pressure during injection molding the articles, which is an industry standard method of improving dispersion. Thus, it is found to be advantageous to practice the invention as claimed in this patent.

Furthermore, comparative example 5 can be directly compared to patent example 5, prepared by the clarifier first blend method. Each of these examples results in the same final composition in the final part, differing in the method by which they are prepared. All examples result in approximately the same drop in L* value from the control resin with no coloring agent. The standard deviation of the L* value is much higher in comparative example 5, indicating that the dispersion of the coloring agent is not as good in comparative example 5, resulting in a variation of the color of the final articles in comparative example 5, which is not desirable. Thus, again, the practice of the invention provides superior performance.

It is understood by one of ordinary skill in the art that the present discussion is a description of exemplary embodiments only, and is not intended as limiting the broader aspects of the present invention, which broader aspects are embodied in the exemplary constructions.

The invention is shown by example in the appended claims.

The invention claimed is:

1. A clarified polypropylene resin composition comprising:
   (a) a polypropylene resin; and
   (b) an additive composition, the additive composition comprising:
      (i) a clarifying agent, and
      (ii) at least one pigment, the pigment being selected from the group consisting of black pigments, purple pigments, blue pigments, and mixtures thereof;
   wherein the clarifying agent and the pigment are present in the additive composition in a ratio of about 50-10,000 parts of pigment to 1 million parts clarifying agent,
   wherein the additive composition exhibits an L* value of at least 85, and
   wherein the clarifying agent is present in the clarified polypropylene resin composition in a concentration of from about 500 ppm to about 5,000 ppm of the total clarified polypropylene resin composition.

2. The clarified polypropylene resin composition of claim 1, wherein said clarifying agent comprises a dibenzylidene sorbitol, or a derivative thereof.

3. The clarified polypropylene resin composition of claim 1, wherein said resin composition has a concentration of pigment of less than about 5 ppm of the total clarified polypropylene resin composition.

4. An article of manufacture formed using the clarified polypropylene resin composition of claim 3.

5. An article of manufacture formed using the clarified polypropylene resin composition of claim 1.

6. The clarified polypropylene resin composition of claim 1, wherein said pigment is a black pigment.

7. The clarified polypropylene resin composition of claim 1, wherein said additive composition is substantially white in color, and exhibits an L* value of at least 90.

8. The clarified polypropylene resin composition of claim 1, wherein the ratio of pigment to clarifying agent is from about 200-5,000 parts of pigment to 1 million parts clarifying agent.

9. The clarified polypropylene resin composition of claim 1 wherein said pigment comprises carbon black.

10. A clarified thermoplastic polymer composition comprising:
   (a) a thermoplastic polymer,
   (b) an additive composition comprising:
      (i) a first agent capable of clarifying the thermoplastic polymer, and
      (ii) at least one pigment, the pigment being selected from the group consisting of black pigments, purple pigments, blue pigments, and mixtures thereof;
   wherein the first agent and the water-insoluble coloring agent are present in the additive composition in a ratio of about 50 to about 10,000 parts of the pigment to 1 million parts of the clarifying agent, wherein the additive composition exhibits an L* value of at least 85, and wherein the clarifying agent is present in the thermoplastic polymer composition in a concentration of from about 500 ppm to about 5,000 ppm of the total clarified polypropylene resin composition.

11. The clarified thermoplastic polymer composition of claim 10, wherein the thermoplastic polymer is polypropylene.

12. The clarified thermoplastic polymer composition of claim 10, wherein the ratio of pigment to clarifying agent is from about 200-5,000 parts of pigment to 1 million parts of the clarifying agent.

13. The clarified thermoplastic polymer composition of claim 10, wherein the additive composition is substantially white in color, and exhibits an L* value of at least 90.

14. The clarified thermoplastic polymer composition of claim 10, wherein the thermoplastic polymer composition further comprises an additive selected from the group consisting of antioxidants, acid scavengers, slip agents, light stabilizers, optical brighteners, UV light absorbers, and mixtures thereof.

15. The clarified thermoplastic polymer composition of claim 10, wherein the clarifying agent is a dibenzylidene sorbitol, or a derivative thereof.

16. The clarified thermoplastic polymer composition of claim 10, wherein the first agent is aluminum bis[2,2'-methylene-bis-(4,6-di-tert-butylphenyl)phosphate].

17. The clarified polypropylene resin composition of claim 1, wherein the clarifying agent is aluminum bis[2,2'-methylene-bis-(4,6-di-tert-butylphenyl)phosphate].

18. The clarified polypropylene resin composition of claim 1, wherein the clarified polypropylene resin composition further comprises an additive selected from the group consisting of antioxidants, acid scavengers, slip agents, light stabilizers, optical brighteners, UV light absorbers, and mixtures thereof.

* * * * *